(12) United States Patent
Palmer et al.

(10) Patent No.: US 8,353,013 B2
(45) Date of Patent: Jan. 8, 2013

(54) AUTHORIZED APPLICATION SERVICES VIA AN XML MESSAGE PROTOCOL

(75) Inventors: Chris Palmer, Austin, TX (US); Michel Laviolette, Cedar Park, TX (US); Benton Thomas Porter, Austin, TX (US)

(73) Assignee: BMC Software, Inc., Houston, TX (US)

( * ) Notice: Subject to any disclaimer, the term of this patent is extended or adjusted under 35 U.S.C. 154(b) by 500 days.

(21) Appl. No.: 12/768,923

(22) Filed: Apr. 28, 2010

(65) Prior Publication Data

US 2011/0271327 A1  Nov. 3, 2011

(51) Int. Cl.
*G06F 15/16* (2006.01)
(52) U.S. Cl. ............... 726/4; 726/27; 713/167; 709/229
(58) Field of Classification Search .................. 726/2–4, 726/18–21; 380/247–250; 705/18, 44; 713/155–159, 168–186
See application file for complete search history.

(56) References Cited

U.S. PATENT DOCUMENTS

| | | | | |
|---|---|---|---|---|
| 5,305,456 A | * | 4/1994 | Boitana ........................... | 726/20 |
| 5,903,720 A | * | 5/1999 | Stokes ............................. | 726/4 |
| 6,377,994 B1 | * | 4/2002 | Ault et al. ...................... | 709/229 |
| 7,146,611 B1 | * | 12/2006 | Phillips ......................... | 717/174 |
| 7,703,135 B2 | * | 4/2010 | Bender et al. .................... | 726/21 |
| 7,822,980 B2 | * | 10/2010 | Botz et al. ...................... | 713/167 |
| 7,954,150 B2 | * | 5/2011 | Croft et al. ...................... | 726/21 |
| 2004/0064668 A1 | * | 4/2004 | Kjos et al. ...................... | 711/202 |
| 2008/0059556 A1 | * | 3/2008 | Greenspan et al. ........... | 709/201 |
| 2008/0208754 A1 | * | 8/2008 | Zunke et al. ...................... | 705/59 |
| 2009/0259993 A1 | * | 10/2009 | Konduri et al. ................ | 717/127 |
| 2010/0274910 A1 | * | 10/2010 | Ghanaie-Sichanie et al. .............................. | 709/229 |
| 2011/0138476 A1 | * | 6/2011 | Black et al. ..................... | 726/27 |

* cited by examiner

*Primary Examiner* — Edan Orgad
*Assistant Examiner* — Fahimeh Mohammadi (57) ABSTRACT

Disclosed are systems and methods to provide a persistent authorized server address space (ASAS). The ASAS can host components from product suites that are not able to execute in an authorized state. To host other product's components, the ASAS receives "messages" from the unauthorized product components in the form of a generic eXtensible Markup Language (XML) protocol. These messages may request product initialization/administration or performance of a function by the ASAS on behalf of the requesting product. Security constraints are also provided to ensure system and data integrity. Further, the ASAS is not tightly coupled to any requesting product so that flexibility of product update or update to the ASAS itself may not be unnecessarily constrained.

22 Claims, 7 Drawing Sheets

```
<COMMAND>
  <TARGET>                                              300
    <DBCSSID>DBC1</DBCSSID>
    <SMFID></SMFID>
    <MVSNAME></MVSNAME>                    310
  </TARGET>
  <INITPROD>
    <AUTOEXEC>NO</AUTOEXEC>
    <PRODUCT>BMC
      <FMID>ZBMC000</FMID>
      <LOADLIB>BMC.ZBMC000.LOAD</LOADLIB>
      <ENCLAVE>ENCLZIIP
        <PERFORM>999</PERFORM>
        <PRIORITY>20</PRIORITY>       350
        <ZIIP>YES</ZIIP>
      </ENCLAVE>                                   340  330  320
      <SAFCLASS>$BMC
        <AGENT>BMCAGNT</AGENT>
        <PROCESS>BMCPROC</PROCESS>
        <SRB>BMCASRB
          <ENCLAVE>ENCLZIIP</ENCLAVE>
          <QUEUE>YES</QUEUE>
        </SRB>
      </SAFCLASS>
    </PRODUCT>
  </INITPROD>
</COMMAND>
```

| | |
|---|---|
| <SEND> | Request to send a message |
|   <PRODUCT>*BMC*</PRODUCT> | Product code |
|   <FMID>*ZBMC000*</FMID> | Product FMID |
|   <PIID>*V6R3M01*</PIID> | Product Instance ID (optional) |
|   <AGENT>*BMCAGNT1*</AGENT> | Agent program name |
|   <TASKID>*1*</TASKID> | Agent task identifier |
|   <MESSAGE>*agent message*</MESSAGE> | Agent message for this send request |
| </SEND> | Close XML send a message element |

AUTHORIZED APPLICATION SERVICES VIA AN XML MESSAGE PROTOCOL

BACKGROUND

This disclosure relates generally to a method and system for a persistent authorized server address space to host components from product suites that are not able to execute in an authorized state. More particularly, but not by way of limitation, this disclosure relates to a method and system to dynamically initialize products and to host authorized application services from non authorized requestors (e.g., products or product components) in a mainframe computer via a generic eXtensible Markup Language (XML) protocol and a persistent authorized server address space (ASAS).

Resource Access Control Facility (RACF®) is a security product for the mainframe computing environment. (RACF is a registered trademark of International Business Systems (IBM) of Armonk, N.Y.). RACF provides functions allowing a system administrator to:
  identify and verify system users;
  identify, classify, and protect system resources;
  authorize the users who need access to the resources you've protected;
  control the means of access to these resources;
  Log and report unauthorized attempts at gaining access to the system and to the protected resources; and
  administer security to meet your installation's security goals.

Independent Software Vendors (ISV's) have historically developed persistent service address-spaces that may interface with RACF and can host authorized functions for those components within their product suite that are not able to execute in an authorized state. However, the coding, testing, implementation architecture, and distribution of hosted functions/components has been tightly coupled to the coding, testing, implementation architecture, and distribution of a corresponding release of a persistent service address space function. This has led to the propagation of many service address-spaces within a given customer environment, thus, adding complexity to the customer environment. This complexity may be difficult for a customer to manage in a production environment. Additionally, software suppliers must have the ability to provide software updates in a controlled and efficient manner.

To overcome these and other limitations of the prior art, it is desirable to improve the implementation of a service address space hosting and authorization function (e.g., an ASAS). Further, more flexibility in the software development process and installation management of components utilizing the disclosed embodiments may also be achieved.

SUMMARY

In one embodiment a method of operating a computer system to provide authorized server address space (ASAS) functions is disclosed. These functions are at the request of one or more unauthorized requestors executing on a computer system. In this embodiment the method comprises instantiation of an ASAS on one or more processors of a mainframe environment. The ASAS is configured to service requests from unauthorized requestors to load a product. The request comprises a product definition document defining attributes of a computer software product and defining one or more components comprising the computer software product. The ASAS can parse the product definition document to create a unique identifier for an instance of the computer software product. The ASAS can also request creation of an address space for the computer software product.

In another embodiment a method of operating a computer system to provide authorized server address space (ASAS) functions is disclosed. In this embodiment the unauthorized requestors provide a request definition document to perform a unit of work. The request for a unit of work comprises a request definition document defining attributes of a computer software product and defining one or more authorized function requests. The ASAS can parse the request definition document to determine a unique identifier for an instance of the computer software product and initiate the authorized function on behalf of the unauthorized requestor. Optionally, a status may be returned to the requestor to indicate the status of the request or the function defined in the request.

DETAILED DESCRIPTION

To overcome the limitations and operational issues described above, a comprehensive system and method whereby an adaptable service address-space can host authorized service functions for multiple product components, possibly on different release/update schedules, is disclosed. Further, to overcome code ownership/source management conflicts and software maintenance scheduling complexities, disclosed embodiments of the adaptable service address-space have no knowledge of, or dependencies on, the application service functions being hosted. In other words, the adaptable service address-space is not tightly coupled to hosted application service functions.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will of course be appreciated that in the development of any such actual implementation (as in any software development project), numerous programming decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking of system level program development for those of ordinary skill having the benefit of this disclosure.

Example embodiments are directed to application initialization and providing authorized application services via an XML message protocol. It will be understood that the disclosed techniques may also be used for other authorized services. For example, Event Management and operator command processing services are authorized services that could be useful to an unauthorized caller. By utilizing the disclosed embodiments an unauthorized database utility may be able to determine the status of a Database Management System (DBMS) or to monitor for changes in the status of a DBMS (e.g., started or stopped). These types of services may be requested of an ASAS by an unauthorized caller providing an XML document via an API to the ASAS. Many other authorized services performed by an ASAS may also be made available to unauthorized callers via disclosed embodiments.

Figure 1:
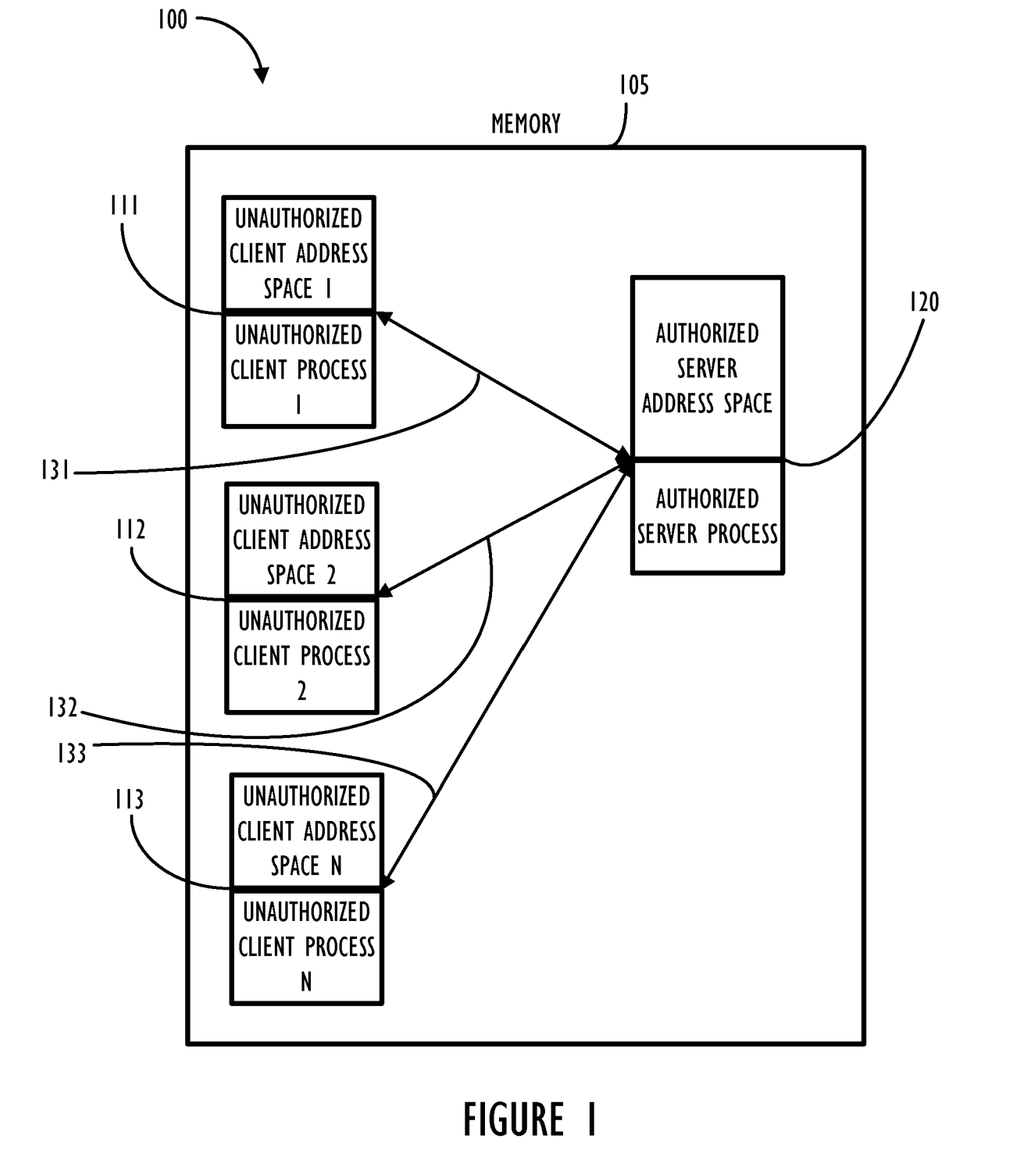
FIG. 1 shows, in block-diagram form, a mainframe memory area divided into multiple address spaces and corresponding processes.

Referring to FIG. 1, a block diagram 100 shows an overall memory area 105 divided into separate memory areas (e.g., address spaces "ASs") within a mainframe environment and processes associated with those memory areas. In a mainframe environment one or more processes may be associated with a single AS. Also, ASs and/or processes may be authorized to perform certain functions not available to an unauthorized AS/process. Memory area 105 shows a plurality of unauthorized client ASs and associated processes 111-113 and a single authorized persistent server AS and its associated authorized process 120. For simplicity, only a single authorized AS 120 is shown, however, a mainframe environment may also have a plurality of independent or inter-related authorized ASs and/or processes.

Also shown in FIG. 1 and explained in more detail below, communication paths 131-133 can exist between processes within a mainframe environment. Those of ordinary skill in the art recognize that pluralities of mechanisms exist for communication between processes and therefore the details of a specific communication mechanism are not discussed here. Note however, communication paths 131-133 may represent either one-way or bidirectional communication between processes.

As used herein, an "initiated process" is an address space created by the ASAS as the result of processing a provided product definition. The creation of one address space by another is sometimes referred to as "spawning." The ASAS will invoke the z/OS ASCRE (address space create) service to create the address space and the ASAS may also create a message queue for the created address space in order to provide a communication mechanism. Because of operating system security constraints, the z/OS ASCRE service can only be invoked by an authorized program. The disclosed embodiments of an ASAS provide the ability for an unauthorized program to use this service. Further, because of operating system security constraints, the ASAS and the functions hosted by the ASAS may be ultimately under the control of RACF.

To deploy a program in an authorized manner, an XML language protocol may be used to allow a user to uniquely define a product and request that product's objects be dynamically initialized into an address space by an authorized service address-space (ASAS). The disclosed implementation may allow for the ASAS to function in an application agnostic manner (i.e., the ASAS infrastructure code has no knowledge of or dependencies on specific application service functions that it may host). In other words, the ASAS is not tightly coupled to any specific product or product release for which the ASAS hosts functions.

The disclosed ASAS can provide a non-authorized Application Programming Interface (API) enabling communication of XML requests to the ASAS's internal request handler tasks. The non-authorized caller can invoke this common API (i.e., API is shared between authorized ASs and unauthorized ASs) to send to the ASAS a Product Definition XML Document (PDXD) that contains a definition of all the components (e.g., objects) which make up a corresponding product. The PDXD can uniquely identify a product through a combination of required and optional XML elements. For example, a 3-byte code, a 7-byte SMP/E FMID value, and a 16 byte product instance identifier (PIID). Each of these elements is required when a uniqueness identity may not be obtained without their inclusion. For example, the PIID is only required to allow multiple instances of the same logical product (e.g., different maintenance levels with same 3-byte code and 7-byte SMP/E FMID value) to be concurrently initialized into the ASAS. Also, in this example the 3-byte code reflects a software vendor's identification mechanism to identify products and the 7-byte code represents a composite of information relative to installed products maintained, at least in part, by components of the IBM operating system. SMP/E refers to System Modification Program Extend and is an installation maintenance product and process supplied by IBM. FMID is an acronym for Function Modification Identifier which is a unique name used to identify a function installed using the IBM SMP/E program product down to a version release number and a maintenance level.

Figure 2:
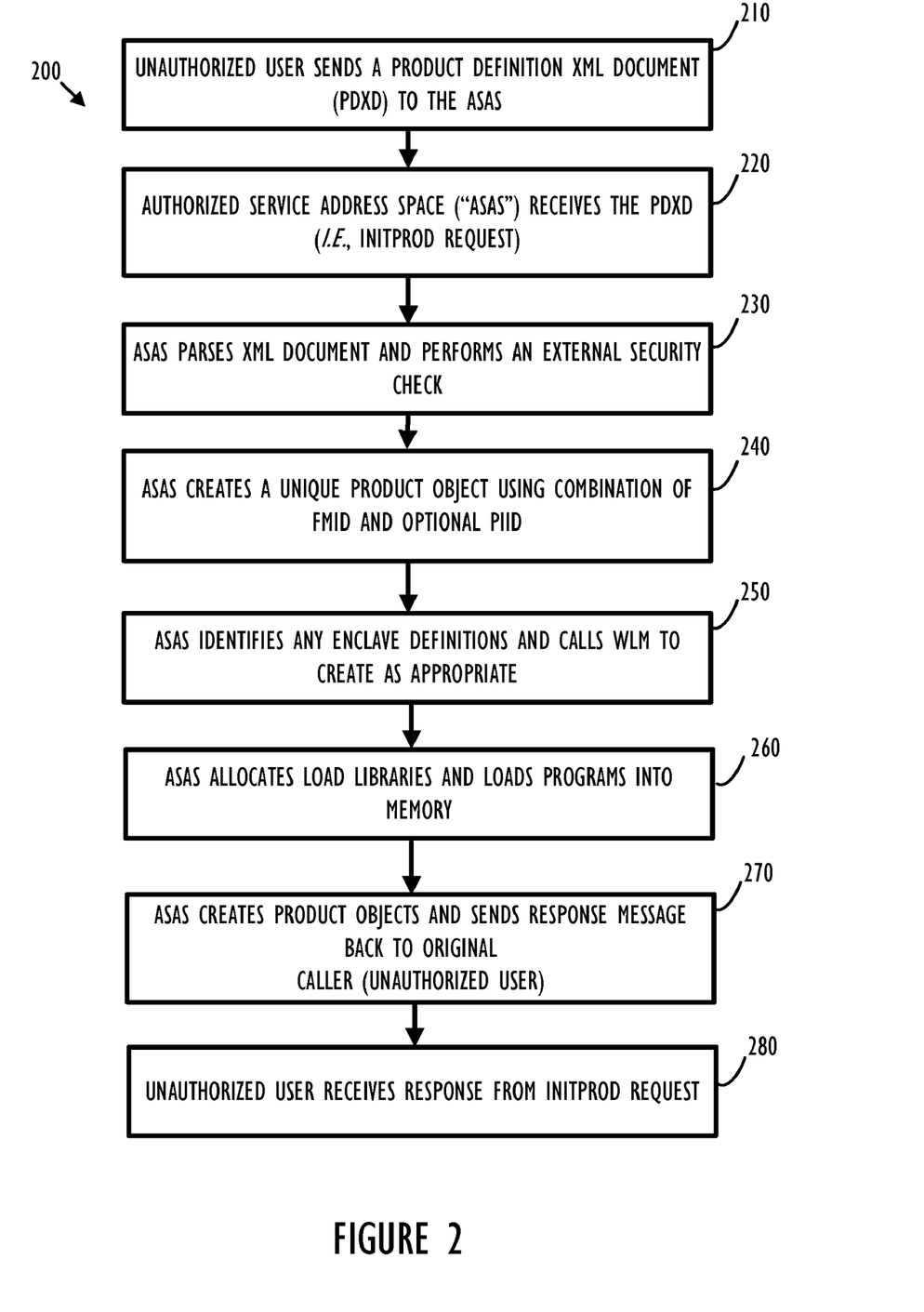
FIG. 2 shows, in flowchart form, a product initialization request in accordance with one disclosed embodiment.

Referring now to FIG. 2, process 200 begins with an unauthorized user communicating with an ASAS using an unauthorized API. The API can retrieve the requesting user's Resource Access Control Facility (RACF) user id from control blocks within the requesting user's address space. The API can then create a control block containing the retrieved user id as well as the XML document provided by the user and other information. In the case of product initialization, the ASAS receives the PDXD at block 220. A sample PDXD 300 is shown in FIG. 3.

Figure 3:
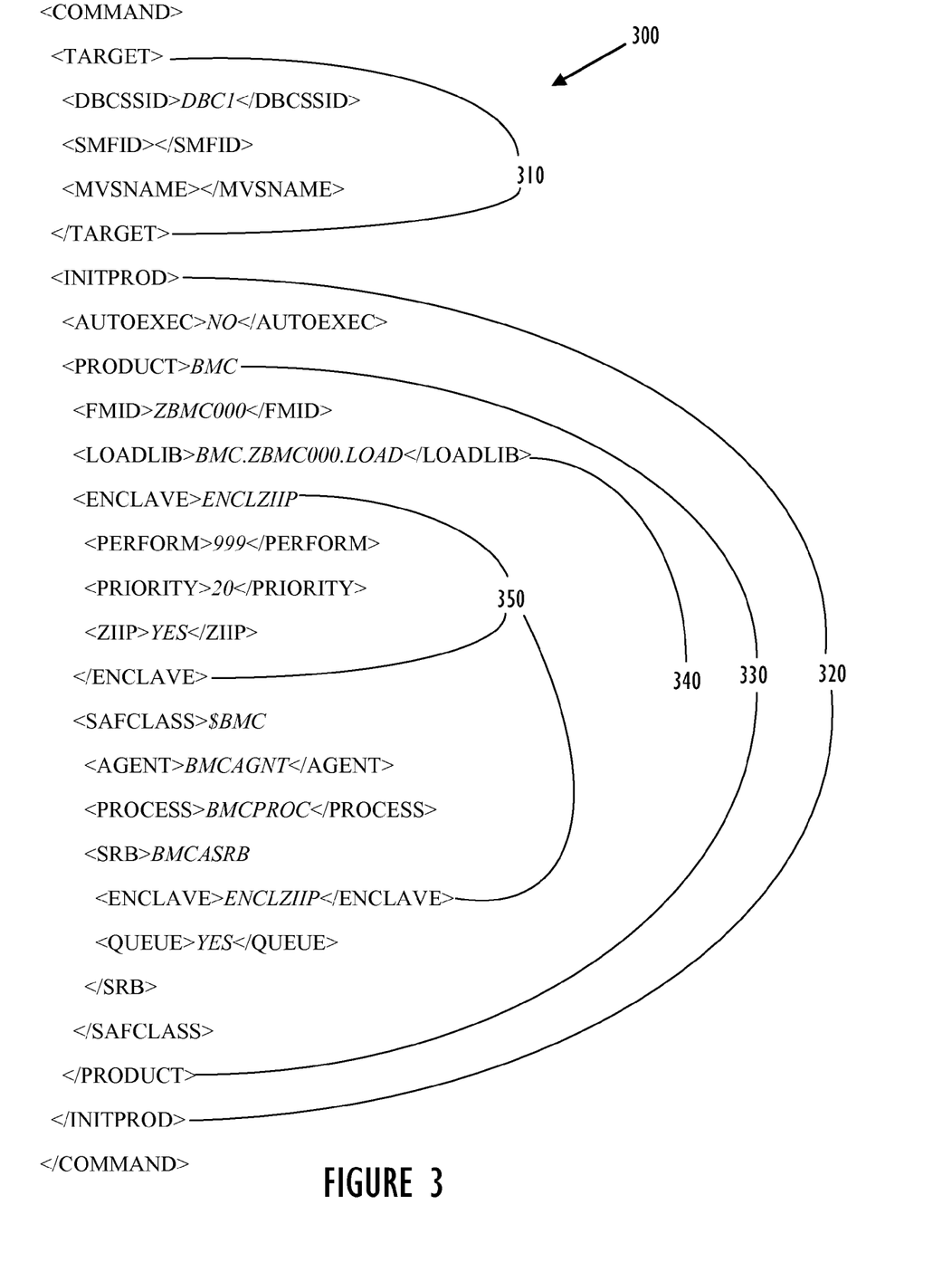
FIG. 3 shows an example of a Product Definition XML Document (PDXD).

Continuing with FIG. 2 and referring also to FIG. 3, the ASAS on the same system as the original caller initially receives the XML <COMMAND> and can route the request to any remote systems based on the optional target XML element (i.e., "<TARGET>" 300). Each ASAS receiving an <INITPROD> (320) command can parse the PDXD and may perform an external security check based on attributes associated with the request as shown at block 230. Also, the ASAS may parse the incoming XML document to ensure it is well formed XML, validate the original caller is authorized (by a system administrator) to execute the <INITPROD> command, serialize the <PRODUCT> (330) section of the <INITPROD> command, instantiate a new product object, and call the initialize method of the product object passing the <INITPROD> request. At block 240, the ASAS creates a unique product object. In a preferred embodiment the unique product object is created using a combination of FMID and optional PIID to ensure proper uniqueness and tracking ability. At block 250 ASAS can identify any enclave definitions (350) and call the Workload Manager (WLM) component of z/OS to create as appropriate. Next, all product load libraries as identified by the <LOADLIB> (340) XML element can be dynamically allocated, concatenated and opened for shared access by the ASAS as shown at block 260. Block 270 represents an instantiation of product component objects. The individual product components that comprise a product definition include <PROCESS> (z/OS address space), <AGENT> (Task Control Block (TCB) unit-of-work), <SRB> (Service Request Block (SRB) unit-of-work), and <FUNCTION> (non-persistent function call executing under the TCB of a service address space request handler task). At successful completion of block 270, all the programs for each of the product components, excluding the <PROCESS> component which is started in another address-space, are loaded and anchored in each of the product component objects. At block 280, upon successful completion of each step of process 200, the product object is put into an enabled state and is available to receive product related requests. A response may be sent back to the original caller to indicate the success/failure of the <INITPROD> request.

A preferred embodiment of an ASAS should also take into account different scenarios of program management. Task Control Blocks (TCBs) and Service Request Blocks (SRBs) are possible units of work in z/OS. A z/OS address space is composed of a number of TCBs. Each TCB represents a program being executed. One program may invoke another in such a way as to create a new TCB. This process is called "attaching" a program because it uses the z/OS ATTACH service. For the purposes of this example, a program may be attached as a job step, or more commonly, as a non-job step. Attaching a program as a job step can only be done by an authorized program and has special considerations and ramifications.

Each job step task has control blocks representing programs invoked using services other than ATTACH. These control blocks can be thought of as representing a module directory. If a main program were to bring into memory another program ("A"), a control block representing program A would be created by z/OS describing the program's length, memory address, and other attributes. One of the attributes may be the "re-entrant" attribute which indicates program A can be executed by multiple callers simultaneously and requiring only one copy in the job step.

For one example of program management, consider program A has the re-entrant attribute and was brought into memory by program MAIN1 using the LOAD service. If MAIN1 was ATTACHed as a job step task, the TCB representing program MAIN1 maps program A. Next, MAIN1 issues an ATTACH for program "SUB1" as a non-job step task and SUB1 subsequently issues a LOAD for program A. The LOAD service will determine that the task representing SUB1 is a non-job step task and will scan the ancestor tasks until it finds a job step task. The TCB for MAIN1 will be found and the module directory of this TCB will be used to locate program A. Because program A has the re-entrant attribute, the LOAD service simply returns the current address of that program. A second copy is not required.

However, had MAIN1 ATTACHed SUB1 as a job step task, the LOAD service would have used SUB1's TCB and correspondingly SUB1's module directory to locate program A. Program A would not have been found in SUB1's module directory and a second copy of program A would have been loaded.

Because of re-entrant modules special care must be taken when considering multiple versions of incompatible libraries containing re-entrant modules being loaded at the same time in a single mainframe environment. For example, if product P1 provides an XML document referencing LOADLIBs at one version, product P2 provides an XML document referencing LOADLIBs at a different, incompatible version, and each set of LOADLIBs contains a non-compatible re-entrant module A, then if the ATTACH is performed as a non-job step task only one copy of module A would be loaded and likely cause problems for either P1 or P2. Thus, in order to support like-named re-entrant modules in a single address space at different and incompatible releases all tasks could be ATTACHed as job step TCBs to ensure that each task starts with an empty module directory. In this manner, two incompatible versions of a like-named re-entrant module will not collide between two products referencing the like-named re-entrant module.

Figure 4:
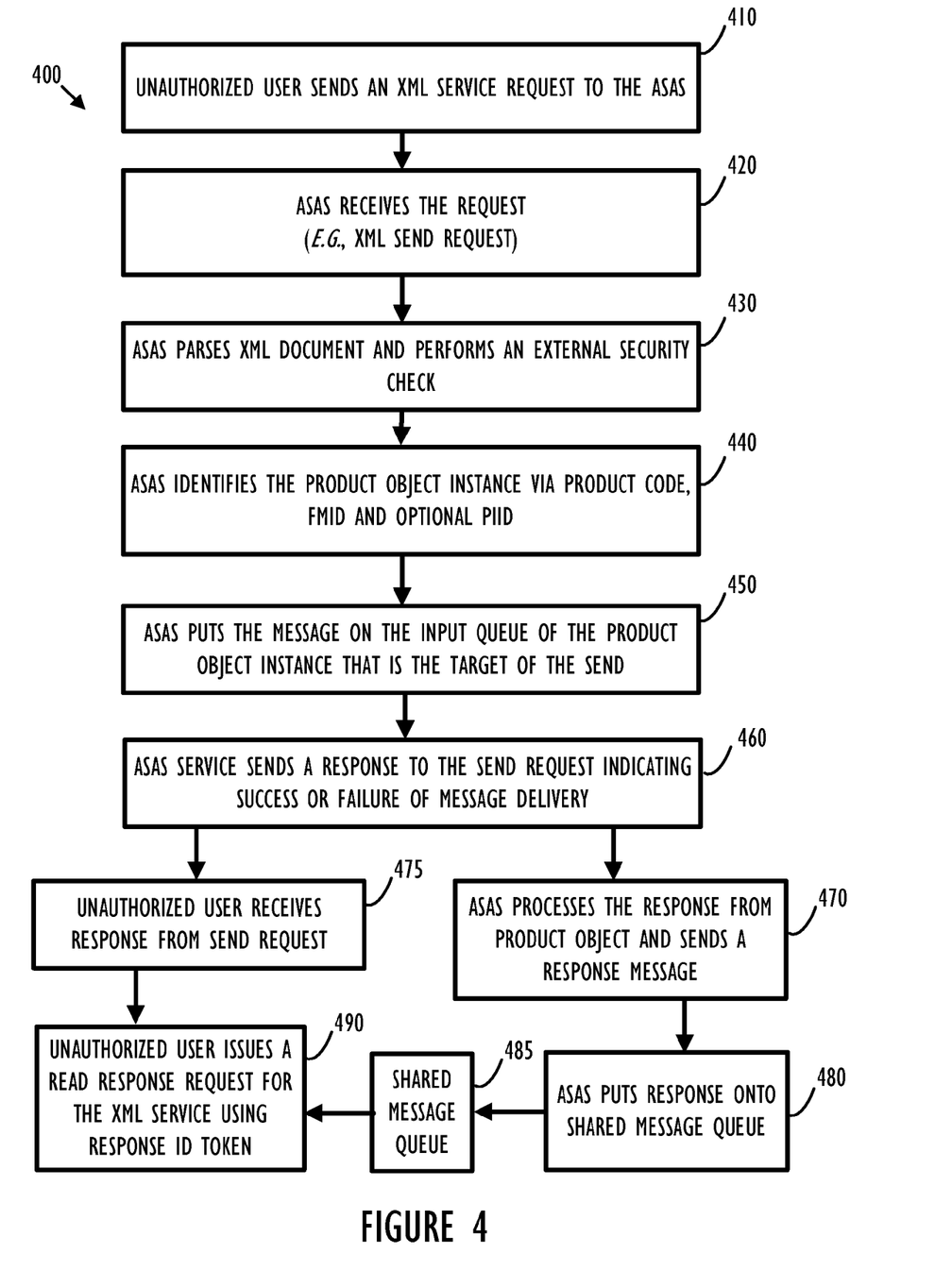
FIG. 4 shows, in flowchart form, an unauthorized user requesting a service from the Authorized Service Address Space (ASAS) in accordance with one disclosed embodiment.
Figure 5:
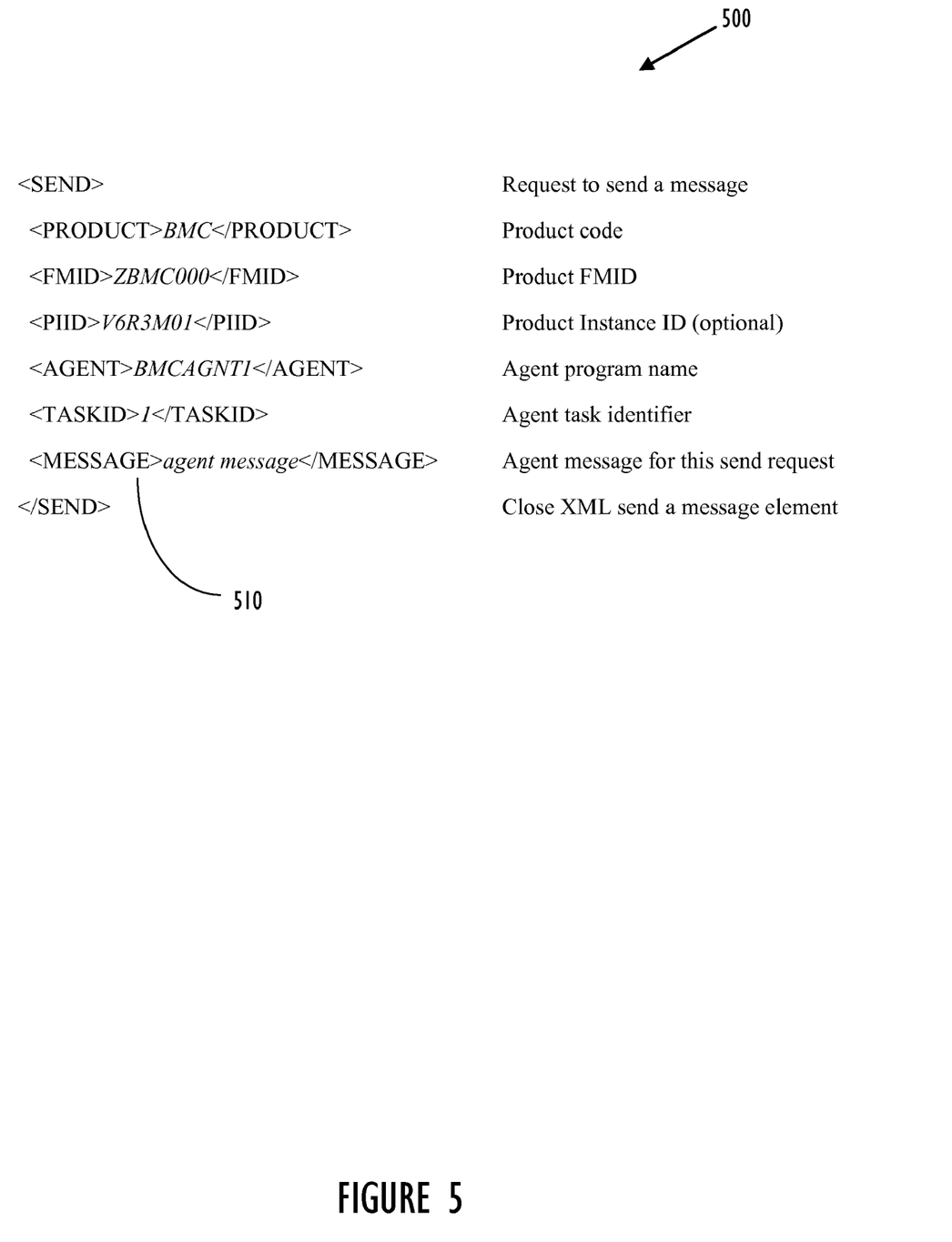
FIG. 5 shows an example of a request definition XML document which could be provided by an unauthorized process to request a function (send) be hosted by the ASAS.

Referring now to FIGS. 4 and 5, FIG. 4 shows a flowchart 400 representing an example request by a user process to an ASAS for performance of a hosted function according to one disclosed embodiment. FIG. 5 shows an example of a portion of an XML document 500 corresponding to flowchart 400. Note the portion shown corresponds to the <INITPROD> portion 320 of FIG. 3 but in this case is a <SEND> request.

Beginning at block 410 an unauthorized user supplies an XML send request to the ASAS. The XML <SEND> request contains elements that identify the product itself and the specific product component instance. The ASAS receives the request at block 420. Next, the ASAS parses the XML document to determine the type of received command and may perform an external security check (block 430). After security checking requirements are satisfied, the Product Object Instance to receive the SEND command is identified uniquely via product code, FMID and optionally a PIID (block 440). Next, at block 450, the ASAS puts the message 510 identified in the XML file 500 on the input queue of the product object instance that is the target of the SEND command. Recall, the same system as the original caller initially receives the XML <COMMAND> and can route the request to any remote systems based on the optional <TARGET> specification. At block 460, the ASAS sends a response to the <SEND> request indicating that the message was delivered successfully.

After block 460, control flows to both of blocks 470 and 475. At block 470 the ASAS processes a response from the Product Object performing work based on the SEND request in the XML document 500. The ASAS puts that response onto the shared message queue at block 480. Also, after block 460, the unauthorized user receives a response from the SEND request as indicated at block 475. The caller can check the return value from the API SEND request to ensure the message was routed to the target product component successfully. If the request was sent successfully, then the caller can use the returned "response identification token" to issue a non-authorized API READ function (block 490), in order to receive a response, via the shared message queue 485, from the actual work performed by the product component instance, i.e., work associated with the actual message that was sent via the XML document 500.

To summarize elements of both process 200 and process 400, the non-authorized user communicates to the ASAS using a non-authorized API. This API can retrieve the user's Resource Access Control Facility (RACF) user id from control blocks within the user's address space. The API can then create a control block containing this user id as well as the XML text provided by the user and other information. The newly created control block can then be passed on to the ASAS as a "message" for processing. Recall, RACF is the z/OS Security Server's documented interface for security calls. RACF uses resource rules which are composed of resource names and permissions. When the ASAS receives a message it can determine the function to be performed and calls the z/OS Security Server via the RACF interface passing it the non-authorized user's RACF user id as well as a resource name derived from the function to be performed. The RACF call can then return a code indicating if the site security administrator has defined a rule for this resource and, if so, whether or not this specific user is allowed to perform the desired function.

In an example embodiment, the site security administrator has the flexibility to not define any resource rules and still allow all users to perform all functions. The administrator may code a parameter in the ASAS's security options file to tell the application to process all RACF calls that indicate the absence of a rule as being successful. Should the administrator wish to restrict execution of certain functions, the administrator may code this parameter to treat such RACF calls as failures and then requests which have no defined rules will be denied. Thus the administrator has the flexibility to easily allow all hosted functions or to create RACF definitions to allow specific users or groups of users to perform one or more of the supported functions.

RACF resource names are essentially strings of characters that logically define a resource. Different sites may have different naming standards. In a preferred embodiment, a great deal of flexibility in the naming of the pertinent resources may be provided by providing symbolic substitution of various qualifiers.

The advantages of the disclosed embodiments easily recognizable to one of ordinary skill in the art, given the benefit of this disclosure, include, but are not limited to:

- The deployment of program code into an authorized subsystem environment may become completely de-coupled from the authorized service code base itself, which could alleviate planning and scheduling problems associated with multiple development teams developing and deploying functionality in the same code base on different schedules.
- The ASAS can have a built in security authorization facility; therefore any program deployed via this methodology can automatically become part of a common security environment.
- The ASAS can provide a cross address-space and intra-sysplex, (i.e. XCF cross system coupling facility), communication channel to each program, which could enable direct communication to those product objects from product code that has access to the ASAS API.
- Programs can leverage the ASAS WLM connection and, via XML, influence their own dispatching priorities and CPU usage statistics collection via an independent Enclave.
- Program code can be dynamically refreshed (i.e., restarted to load a new copy).
- Programs can leverage the Event Management Service (EMS) features of an ASAS and subscribe to ASAS events and/or publish their own product events.
- Programs can leverage the operator command processor services of the ASAS and dynamically define an operator command interface directly to their own individual product components.
- Programs can leverage a Repository service of an ASAS so that product definitions can be persistent and program components can be automatically executed during ASAS initialization and/or product initialization.

Figure 6:
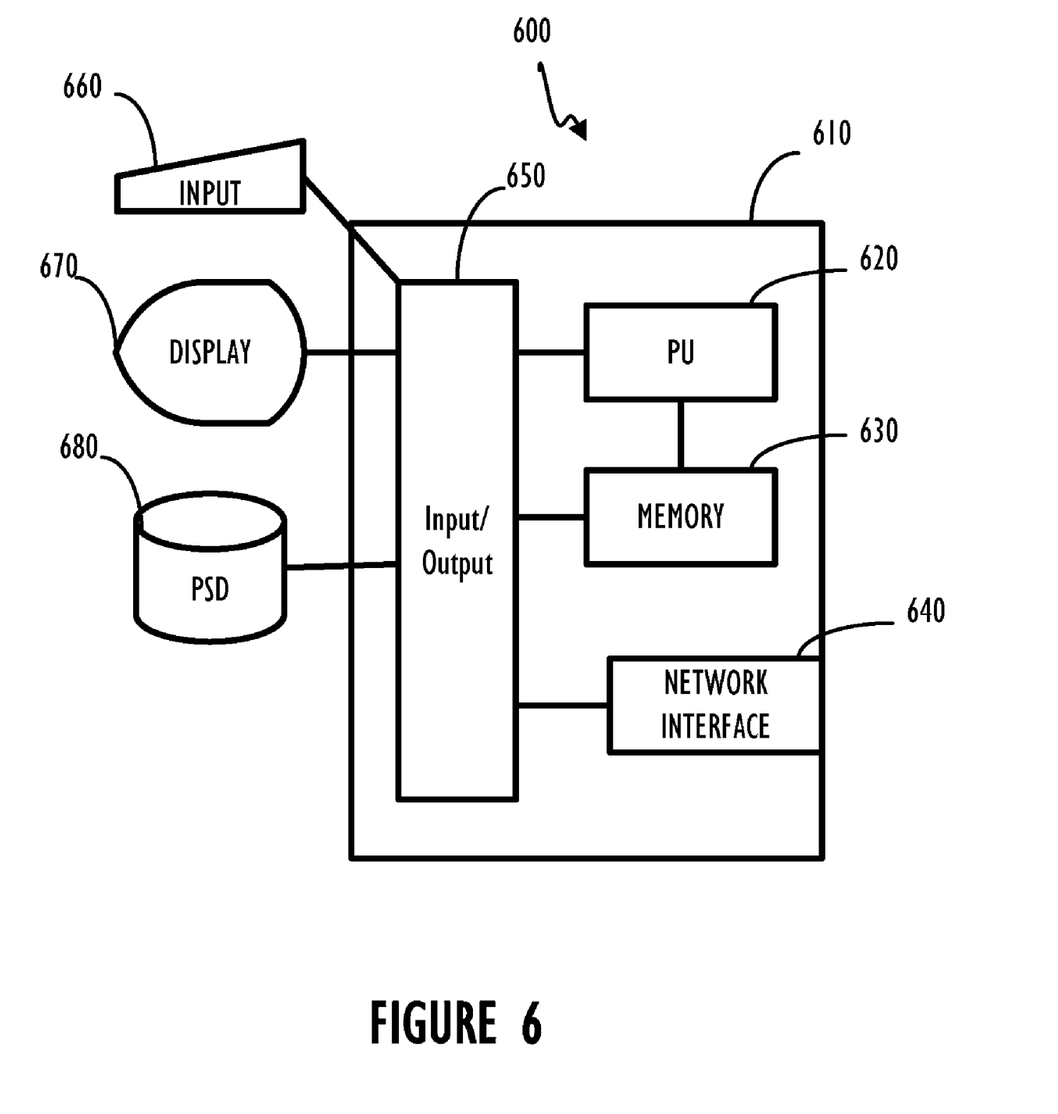
FIG. 6 shows, in block diagram form, a general purpose computer system in accordance with various disclosed embodiments.

Referring to FIG. 6, illustrative general purpose computer system 600 programmed to perform methods in accordance with the disclosed embodiments (e.g., those illustrated in FIG. 2 or 4) includes programmable control device 610, display unit 670, input device 660, and external storage units 680 (e.g., tape or direct access storage device, DASD). Programmable control device 610 comprises input-output (I/O) unit 650, processing unit 620, memory 630, and network interface 640 (either included in or communicatively coupled to programmable control device 610). Display 670 represents both an output display unit and a touch screen input unit with, optionally, one or more, input devices 660 such as a mouse or keyboard. External storage unit 680 further represents any form of non-volatile storage including, but not limited to, all forms of optical and magnetic storage elements including solid-state storage. Program control device 610 may be included in a computing device and be programmed to perform methods in accordance with this disclosure (e.g., those illustrated in FIGS. 2 and 4). Processing unit 620 may include any programmable controller device including, for example, processors of an IBM mainframe (such as a quad-core z10 mainframe microprocessor). Alternatively, in non mainframe systems examples of processing unit 620 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory and solid state memory. One of ordinary skill in the art will also recognize that PU 620 typically includes some internal memory including, for example, cache memory.

Various changes in the materials, components, circuit elements, as well as in the details of the illustrated operational methods are possible without departing from the scope of the following claims. For instance, acts in accordance with FIG. 2 or 4 may be performed by a programmable control device executing instructions organized into one or more modules (comprised of computer program code or instructions). A programmable control device may be a single computer processor (e.g., PU 620), a plurality of computer processors coupled by a communications link or one or more special purpose processors (e.g., a digital signal processor, DSP). Such a programmable control device may be one element in a larger data processing system such as general purpose computer system 600. Storage media as embodied in storage devices such as 630 and 680, as well as memory internal to PU 620, suitable for tangibly embodying computer program instructions include, but are not limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices.

Figure 7:
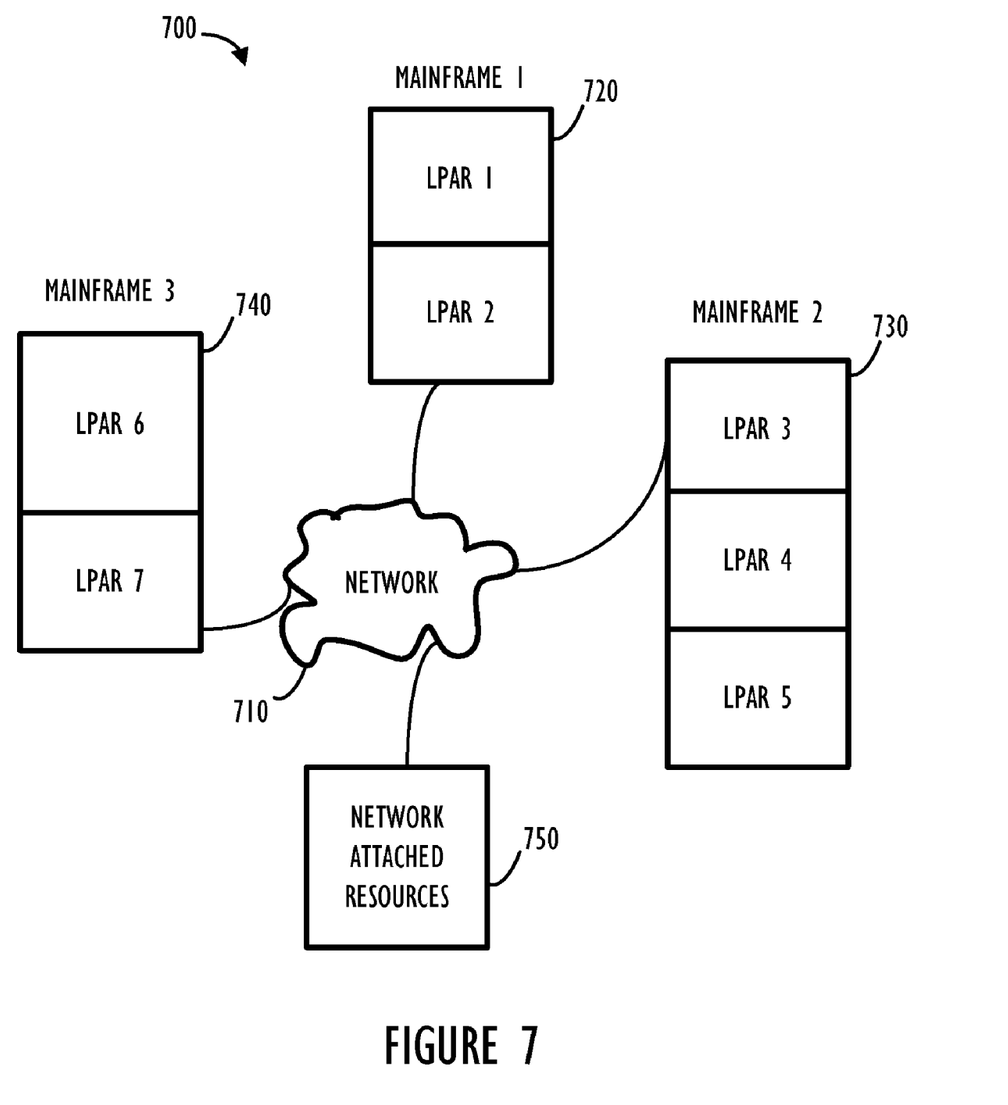
FIG. 7 shows, in block diagram form, a computer network in accordance with various disclosed embodiments.

In addition, computer system 600 could be one of a multiplicity of computer systems coupled through a computer network. As illustrated in FIG. 7, computer network 700 comprises network attached resources 750 coupled to host computer systems (e.g., of the type illustrated in FIG. 6). Logical Partitions 1-7 (See 720, 730 and 740) communicate through network 710—which could be one or more intranets, one or more extranets (e.g., the Internet) or a combination of both intra- and extranets. In network 700, computer system 720, for example, could include memory for retaining program modules for performing any of the methods illustrated in FIG. 2 or 4.

Finally, while methods in accordance with FIGS. 2 and 4 have been discussed in the context of embodiments targeted for the z/OS operating system, the disclosed embodiments are not so limited. It will also be recognized that each implementation of an operating system may apply its own unique terms to the concepts discussed here. Accordingly, the preceding descriptions and the following claims are not limited in scope to implementations of the z/OS operating system.

We claim:

1. A method of operating a computer system to provide authorized server address space (ASAS) functions at the request of one or more unauthorized requestors executing on the computer system, the method comprising:

instantiating an ASAS to execute on one or more processors of a mainframe environment wherein the ASAS is configured to service requests from unauthorized requestors;

receiving a request at the ASAS to load a product wherein the request comprises a product definition document defining attributes of a computer software product and defining one or more components comprising the computer software product;

parsing the product definition document to create a unique identifier for an instance of the computer software product;

requesting creation of an address space for the computer software product.

2. The method of claim 1 further comprising performing a security check using attributes of the unauthorized requestor prior to requesting creation of an address space.

3. The method of claim 2 where in the security check is performed by interfacing with resource access control facility (RACF).

4. The method of claim 1 further comprising creating an enclave as defined in the product definition document.

5. The method of claim 1 further comprising requesting loading of libraries as defined in the product definition document.

6. The method of claim 5 wherein the loading of libraries is performed as a result of a job step task.

7. The method of claim 1 where the product definition document is an extensible markup language (XML) document.

8. The method of claim 1 further comprising:

parsing the product definition document to determine a target system environment for the request;

sending a request to initiate further processing of the product definition document in the target system environment if the target system environment is different from the system executing the unauthorized requestor; and returning a status of the initiated further processing to the unauthorized requestor on the system executing the unauthorized requestor.

9. A computer readable storage device having computer-executable instructions stored thereon for operating a computer system to perform the method of claim 1.

10. A computer network comprising:

a plurality of processing units communicatively coupled to a computer network;

a first processing unit configured to perform at least a portion of the method of claim 1 wherein the entire method of claim 1 is performed collectively by the plurality of processing units.

11. A method of operating a computer system to provide authorized server address space (ASAS) functions at the request of one or more unauthorized requestors executing on the computer system, the method comprising:

instantiating an ASAS to execute on one or more processors of a mainframe environment wherein the ASAS is configured to service requests from unauthorized requestors;

receiving a request at the ASAS to perform an authorized function on behalf of the unauthorized requestor wherein the request comprises a request definition document defining attributes of a computer software product and defining one or more authorized function requests;

parsing the request definition document to determine a unique identifier for an instance of the computer software product; and initiating the authorized function.

12. The method of claim 11 further comprising performing a security check using attributes of the unauthorized requestor prior to initiating the authorized function.

13. The method of claim 12 where in the security check is performed by interfacing with resource access control facility (RACF).

14. The method of claim 11 further comprising:

parsing the request definition document to determine a target system environment for the request;

sending a request to initiate further processing of the request definition document in the target system environment if the target system environment is different from the system executing the unauthorized requestor; and returning a status of the request to the unauthorized requestor on the system executing the unauthorized requestor.

15. The method of claim 11 wherein the attributes of a computer software product include a product instance identification (PIID).

16. The method of claim 11 wherein the request definition document is a extensible markup language (XML) document.

17. The method of claim 11 wherein the request definition document comprises an event management request.

18. The method of claim 11 wherein the request definition document comprises an operator command request.

19. A computer readable storage device having computer-executable instructions stored thereon for operating a computer system to perform the method of claim 11.

20. A computer network comprising:

a plurality of processing units communicatively coupled to a computer network;

a first processing unit configured to perform at least a portion of the method of claim 11 wherein the entire method of claim 9 is performed collectively by the plurality of processing units.

21. A computer system comprising one or more programmable control devices communicatively coupled to each other and to a computer network, wherein the one or more programmable control devices are programmed to:

instantiate an ASAS to execute on one or more processors of a mainframe environment wherein the ASAS is configured to service requests from unauthorized requestors;

receive a request at the ASAS to load a product wherein the request comprises a product definition document defining attributes of a computer software product and defining one or more components comprising the computer software product;

parse the product definition document to create a unique identifier for an instance of the computer software product;

request creation of an address space for the computer software product.

22. A computer system comprising one or more programmable control devices communicatively coupled to each other and to a computer network, wherein the one or more programmable control devices are programmed to:

instantiate an ASAS to execute on one or more processors of a mainframe environment wherein the ASAS is con figured to service requests from unauthorized requestors;

receive a request at the ASAS to perform an authorized function on behalf of the unauthorized requestor wherein the request comprises a request definition document defining attributes of a computer software product and defining one or more authorized function requests;

parse the request definition document to determine a unique identifier for an instance of the computer software product; and initiate the authorized function.

* * * * *

UNITED STATES PATENT AND TRADEMARK OFFICE
CERTIFICATE OF CORRECTION

PATENT NO. : 8,353,013 B2
APPLICATION NO. : 12/768923
DATED : January 8, 2013
INVENTOR(S) : Chris Palmer et al.

It is certified that error appears in the above-identified patent and that said Letters Patent is hereby corrected as shown below:

In column 10, line 42, in claim 20, delete "claim 9" and insert -- claim 11 --, therefor.

Signed and Sealed this
Twelfth Day of March, 2013

Teresa Stanek Rea
*Acting Director of the United States Patent and Trademark Office*